United States Patent
Seo et al.

(10) Patent No.: US 10,064,041 B2
(45) Date of Patent: Aug. 28, 2018

(54) METHOD FOR SETTING CYCLIC PREFIX FOR D2D (DEVICE-TO-DEVICE) COMMUNICATION IN RADIO COMMUNICATIONS SYSTEM AND APPARATUS THEREFOR

(71) Applicant: LG ELECTRONICS INC., Seoul (KR)

(72) Inventors: Daewon Seo, Seoul (KR); Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 278 days.

(21) Appl. No.: 14/760,455

(22) PCT Filed: Jan. 24, 2014

(86) PCT No.: PCT/KR2014/000705
§ 371 (c)(1),
(2) Date: Jul. 10, 2015

(87) PCT Pub. No.: WO2014/119880
PCT Pub. Date: Aug. 7, 2014

(65) Prior Publication Data
US 2015/0358801 A1 Dec. 10, 2015

Related U.S. Application Data

(60) Provisional application No. 61/758,781, filed on Jan. 31, 2013.

(51) Int. Cl.
*H04W 72/02* (2009.01)
*H04W 8/00* (2009.01)
(Continued)

(52) U.S. Cl.
CPC ......... *H04W 8/005* (2013.01); *H04J 11/0086* (2013.01); *H04L 5/0044* (2013.01);
(Continued)

(58) Field of Classification Search
CPC ... H04W 8/005; H04W 72/048; H04W 72/02; H04L 5/0044; H04L 27/26; H04L 27/2607
See application file for complete search history.

(56) References Cited

U.S. PATENT DOCUMENTS 8,477,641 B2 * 7/2013 Yamazaki ......... H04W 56/0005
370/252
2006/0013325 A1 1/2006 Agrawal et al.
(Continued)

FOREIGN PATENT DOCUMENTS

| CN | 101213807 | 7/2008 |
|---|---|---|
| CN | 101488932 | 7/2009 |

(Continued)

OTHER PUBLICATIONS

PCT International Application No. PCT/KR2014/000705, Written Opinion of the International Searching Authority dated May 26, 2014, 19 pages.
(Continued)

*Primary Examiner* — Wei Zhao
(74) *Attorney, Agent, or Firm* — Lee Hong Degerman Kang Waimey

(57) ABSTRACT

The present invention relates to a method for enabling a D2D communicating terminal to transmit and receive a signal in a radio communication system, and an apparatus therefor. Specifically, the method includes the step of transmitting and receiving a signal by using a frame with a given length of CP (Cyclic Prefix), wherein the given length of CP is set to one of a first length of CP and a second length of
(Continued)

CP, the first length of CP is the CP length set for communication between a base station and a terminal, and the second length of CP is the CP length set for communication between two terminals.

9 Claims, 12 Drawing Sheets

(51) Int. Cl.
*H04W 72/04* (2009.01)
*H04L 5/00* (2006.01)
*H04L 27/26* (2006.01)
*H04J 11/00* (2006.01)

(52) U.S. Cl.
CPC ......... *H04L 27/2607* (2013.01); *H04W 72/02* (2013.01); *H04W 72/048* (2013.01); *H04J 2011/0096* (2013.01)

(56) References Cited

U.S. PATENT DOCUMENTS

| | | | |
|---|---|---|---|
| 2011/0064038 A1 | 3/2011 | Kuo | |
| 2012/0281551 A1 | 11/2012 | Alanara | |
| 2013/0188546 A1* | 7/2013 | Turtinen | H04W 8/005 370/312 |
| 2014/0064263 A1* | 3/2014 | Cheng | H04W 8/005 370/350 |
| 2015/0215979 A1* | 7/2015 | Nan | H04W 76/023 370/329 |

FOREIGN PATENT DOCUMENTS

| | | |
|---|---|---|
| CN | 102238122 | 11/2011 |
| CN | 102547984 | 7/2012 |
| KR | 10-2010-0119508 | 11/2010 |
| WO | 2012/129806 | 10/2012 |

OTHER PUBLICATIONS

PCT International Application No. PCT/KR2014/000705, Written Opinion of the International Searching Authority dated May 26, 2014, 16 pages.
State Intellectual Property Office of the People's Republic of China Application Serial No. 201480007111.3, Office Action dated Jun. 1, 2017, 18 pages.
The State Intellectual Property Office of the People's Republic of China Application Serial No. 201480007111.3, Office Action dated Jan. 23, 2018, 7 pages.

* cited by examiner

FIG. 2
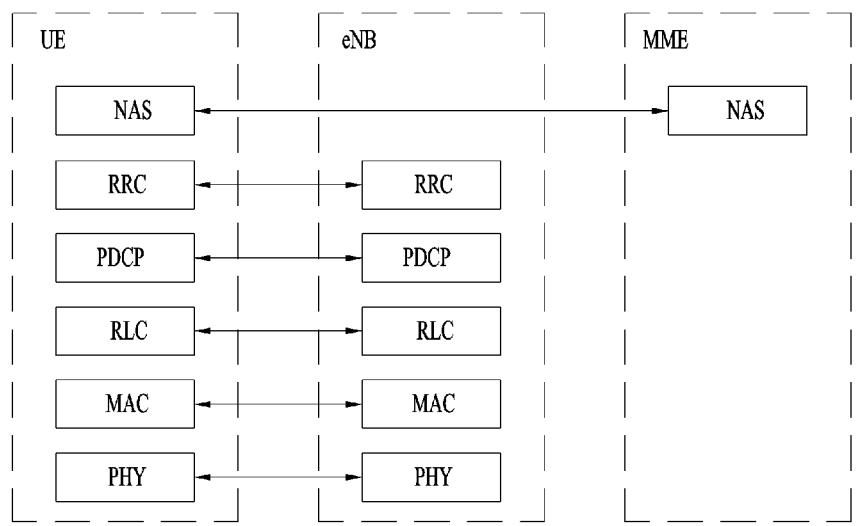
(a) Control-plane protocol stack
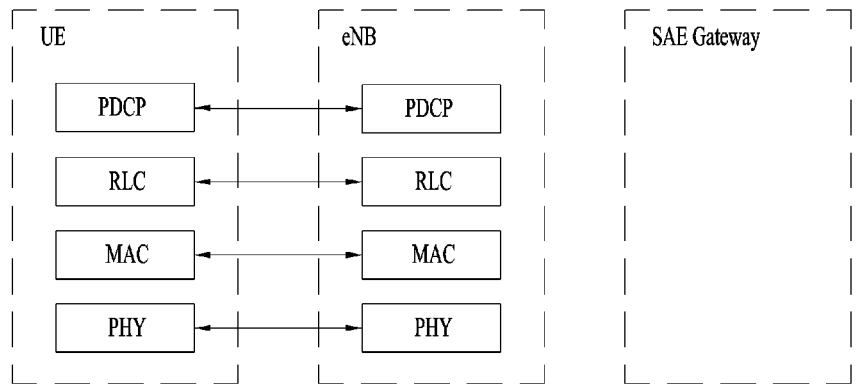
(b) User-plane protocol stack (a)        (b)

METHOD FOR SETTING CYCLIC PREFIX FOR D2D (DEVICE-TO-DEVICE) COMMUNICATION IN RADIO COMMUNICATIONS SYSTEM AND APPARATUS THEREFOR

CROSS-REFERENCE TO RELATED APPLICATIONS

This application is the National Stage filing under 35 U.S.C. 371 of International Application No. PCT/KR 2014/000705, filed on Jan. 24, 2014, which claims the benefit of U.S. Provisional Application No. 61/758,781, filed on Jan. 31, 2013, the contents of which are all hereby incorporated by reference herein in their entirety.

TECHNICAL FIELD

The present invention relates to a wireless communication system, and more particularly, to a method for setting cyclic prefix for D2D (device-to-device) communication in radio communication system and apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

The technical task of the present invention is to provide a method for setting cyclic prefix for D2D (device-to-device) communication in radio communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of transceiving signals, in a user equipment performing D2D (device-to-device) communication in a wireless communication system, including the step of transceiving the signals using a frame having a prescribed CP (cyclic prefix) length, wherein the prescribed CP length is set to either a $1^{st}$ CP length or a $2^{nd}$ CP length, wherein the $1^{st}$ CP length corresponds to a CP length set for communication between a base station and the user equipment, and wherein the $2^{nd}$ CP length corresponds to a CP length set for communication between the user equipment and a different user equipment.

Preferably, the prescribed CP length is determined based on a discovery signal for the D2D communication.

More preferably, the discovery signal may include PSS (primary synchronization signal) and SSS (secondary synchronization signal) for the D2D communication and the CP length is determined in accordance with a timing difference between the PSS and the SSS. Further preferably, the SSS is set ahead of the PSS by one OFDM (orthogonal frequency division multiplexing) symbol.

Preferably, the discovery signal may include a parameter set different for each of a normal CP and an extended CP and the prescribed CP length is determined based on the parameter included in the discovery signal.

Preferably, the prescribed CP length is maintained until a new discovery signal for the D2D communication is received Preferably, the prescribed CP length is independently set for each of at least one of different user equipments Preferably, the prescribed CP length is set different for each of a multitude of D2D groups for the D2D communication and each of a multitude of the D2D groups is configured with either at least one user equipment or a base station. More preferably, if the signals are simultaneously transmitted to a multitude of the D2D groups, the signals are transmitted to only one D2D group determined according to priority depending on the CP length.

In a $2^{nd}$ technical aspect of the present invention, provided herein is a user equipment for performing D2D (device-to-device) communication in a wireless communication system, including a radio frequency unit and a processor configured to transceive signals using a frame having a prescribed CP length, wherein the prescribed CP length is set to either a $1^{st}$ CP length or a $2^{nd}$ CP length, wherein the $1^{st}$ CP length corresponds to a CP length set for communication between a base station and the user equipment, and wherein the $2^{nd}$ CP length corresponds to a CP length set for communication between the user equipment and a different user equipment.

Advantageous Effects

According to the present invention, cyclic prefix can be efficiently set in case of simultaneously performing D2D communication and eNB communication in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram for structures of control and user planes of a radio interface protocol between a user equipment and E-UTRAN based on 3GPP radio access network standard.

BEST MODE FOR INVENTION

Figure 1:
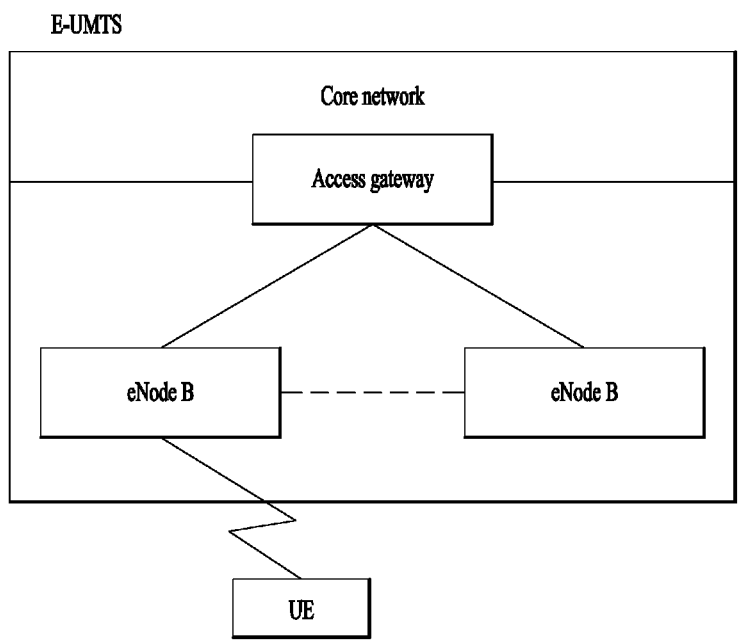
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
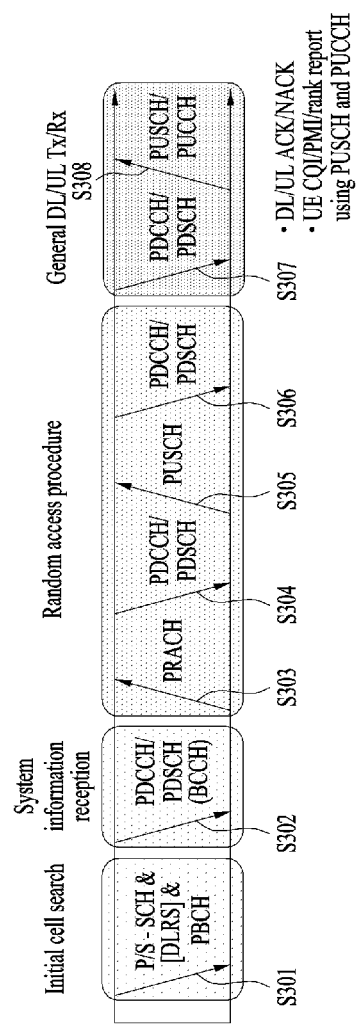
FIG. 3 is a diagram of physical channels used for 3GPP LTE system and a general method of transmitting a signal using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
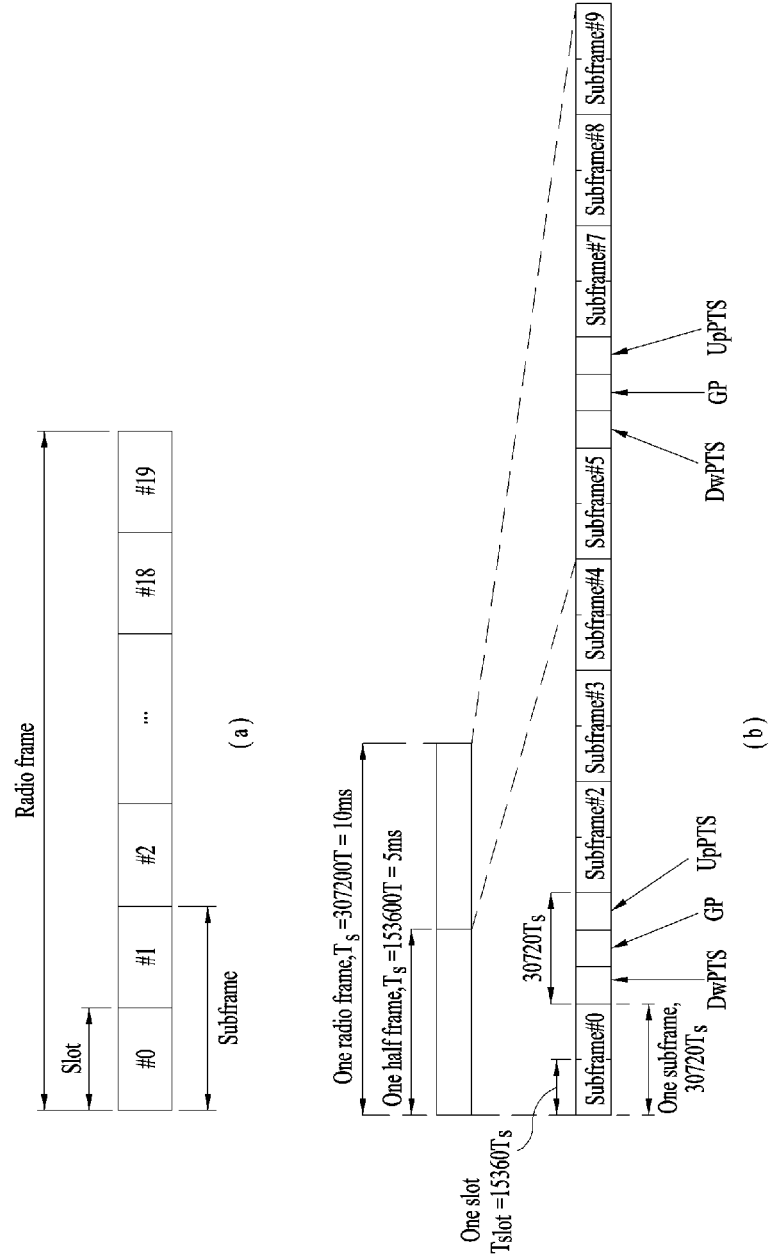
FIG. 4 is a diagram for a structure of a radio frame used in LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols.

At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

The structure of the aforementioned radio frame is only exemplary, and various modifications may be made in the number of subframes included in the radio frame, the number of slots included in the subframe, or the number of symbols included in the slot.

Figure 5:
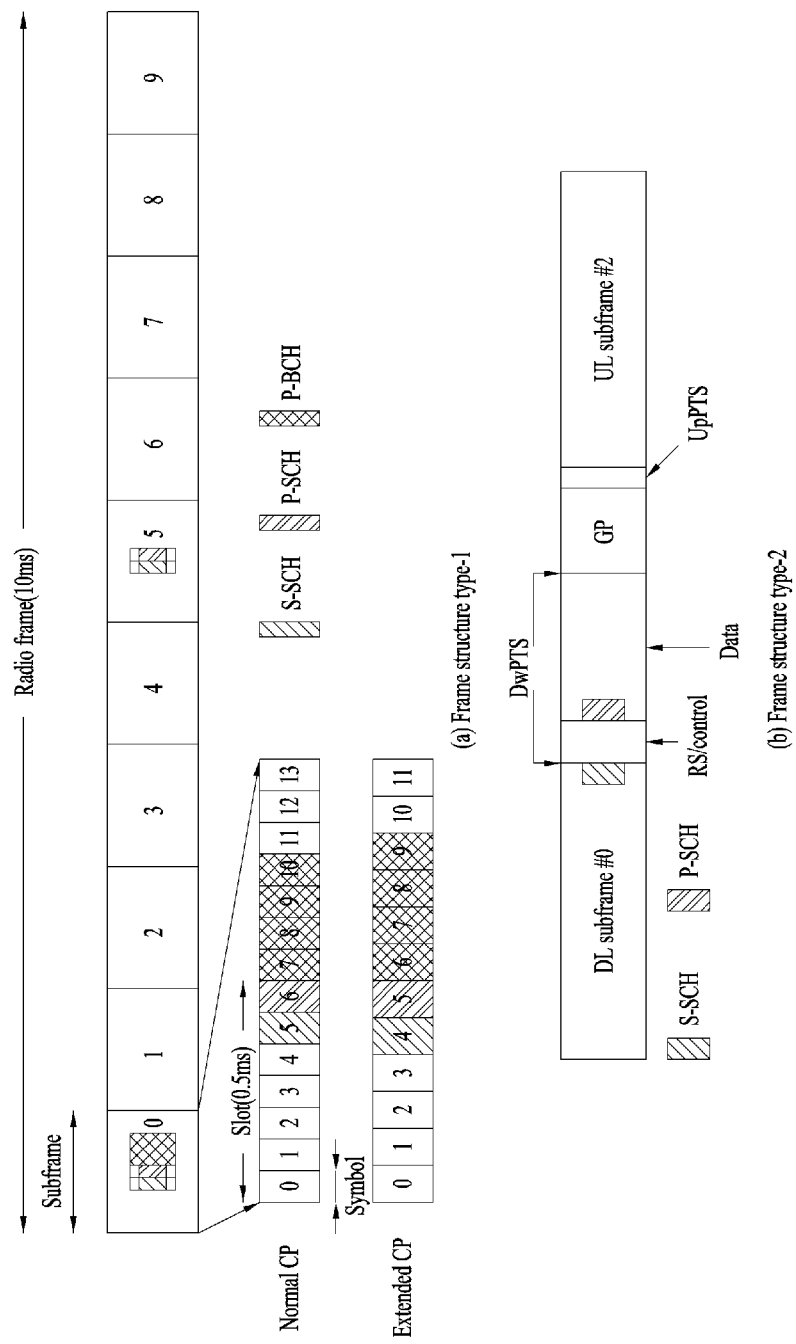
FIG. 5 is a diagram for examples of structures of a synchronization channel and a broadcast channel in a radio frame.

FIG. 5 shows examples of P-BCH (primary broadcast channel) and SCH (synchronization channel) in LTE system. The SCH includes P-SCH and S-SCH. PSS (primary synchronization signal) is transmitted on the P-SCH and SSS (secondary synchronization signal) is transmitted on the S-SCH.

Referring to FIG. 5, in case of frame structure type-1 (i.e. FDD), the P-SCH is located in a last OFDM symbol in each of a slot #0 (i.e., $1^{st}$ slot of subframe #0) and a slot #10 (i.e., $1^{st}$ slot of subframe #5) of each radio frame. The S-SCH is located in an OFDM symbol immediately before the last OFDM symbol in each of the slot #0 and the slot #10 of each radio frame. The S-SCH and the P-SCH are located at OFDM symbols adjacent to each other. In case of frame structure type-2 (i.e., TDD), the P-SCH is transmitted through a $3^{rd}$ OFDM symbol of subframe #1/#6 and the S-SCH is located in a last OFDM symbol in each of a slot #1 (i.e., $2^{nd}$ slot of subframe #0) and a slot #11 (i.e., $2^{nd}$ slot of subframe #5). The P-BCH is transmitted once in every 4 radio frames using $1^{st}$ to $4^{th}$ OFDM symbols of the $2^{nd}$ slot of the subframe #0 irrespective of a frame structure type.

TABLE 1

| | | Normal cyclic prefix in downlink | | | Extended cyclic prefix in downlink | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The P-SCH is transmitted using 72 subcarriers (10 subcarriers are reserved and 62 subcarriers are used for a PSS transmission) centering on DC (direct current) subcarrier in a corresponding OFDM symbol. The S-SCH is transmitted using 72 subcarriers (10 subcarriers are reserved and 62 subcarriers are used for a SSS transmission) centering on DC (direct current) subcarrier in a corresponding OFDM symbol. The P-BCH is mapped to 72 subcarriers centering on 4 OFDM symbols and DC (direct current) subcarrier in one subframe.

Figure 6:
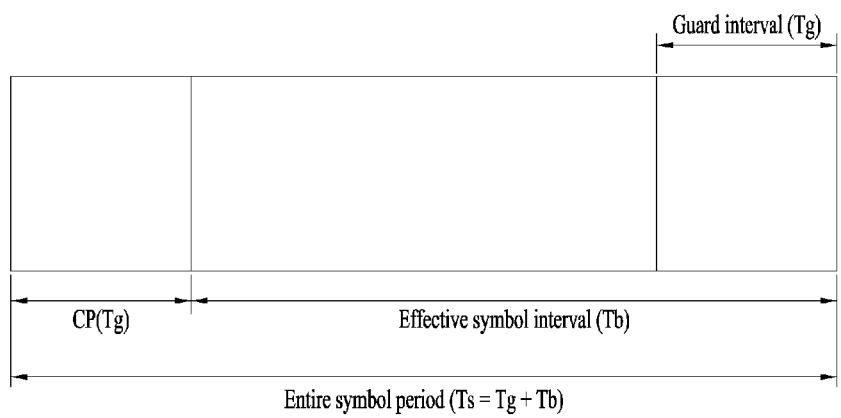
FIG. 6 is a diagram for a structure of a symbol including cyclic prefix (CP).

FIG. 6 is a diagram for a structure of a symbol including cyclic prefix (CP).

Referring to FIG. 6, a symbol period (Ts) corresponds to a sum of an effective symbol interval (Tb), in which data is actually transferred, and a guard interval (Tg). A receiving side obtains data from the effective symbol interval after eliminating the guard interval and then performs demodulation. A transmitting side and the receiving side can be synchronized with each other using a cyclic prefix symbol and maintain orthogonality between data symbols. The symbol mentioned in the present invention may correspond to an OFDMA symbol.

Figure 7:
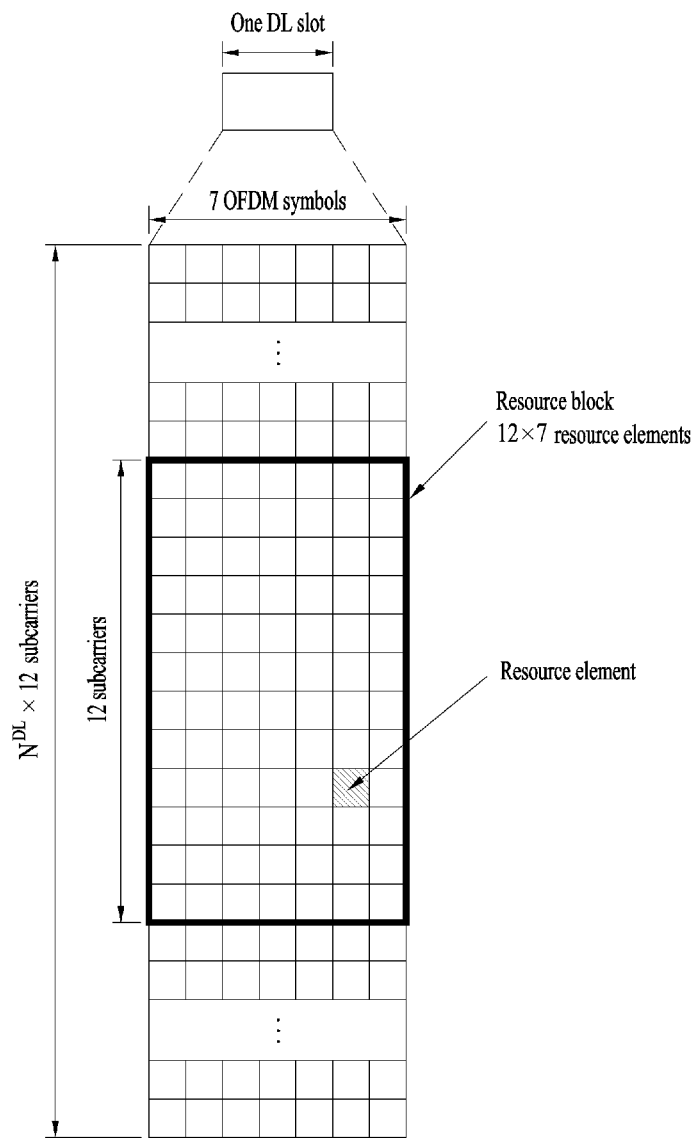
FIG. 7 is a diagram of a resource grid for a downlink slot.

FIG. 7 is a diagram of a resource grid for a downlink slot.

Referring to FIG. 7, a downlink slot includes $N_{symb}^{DL}$ OFDM symbols in time domain and $N_{RB}^{DL}$ resource blocks in frequency domain. Since each of the resource blocks includes $N_{sc}^{RB}$ subcarriers, the downlink slot includes $N_{RB}^{DL} \times N_{sc}^{RB}$ subcarriers in frequency domain. FIG. 7 illustrates that the downlink slot includes 7 OFDM symbols and the resource block includes 12 subcarriers, by which the present invention may be non-limited. For instance, the number of OFDM symbols included in the downlink slot may vary depending on a length of cyclic prefix (CP).

Each element on a resource grid is called a resource element (hereinafter abbreviated RE). One resource element is indicated by one OFDM symbol index and one subcarrier index. One RB includes $N_{symb}^{DL} \times N_{sc}^{RB}$ resource elements. The number $N_{RB}^{DL}$ of resource blocks included in the downlink slot depends on a downlink transmission bandwidth configured in a cell.

Figure 8:
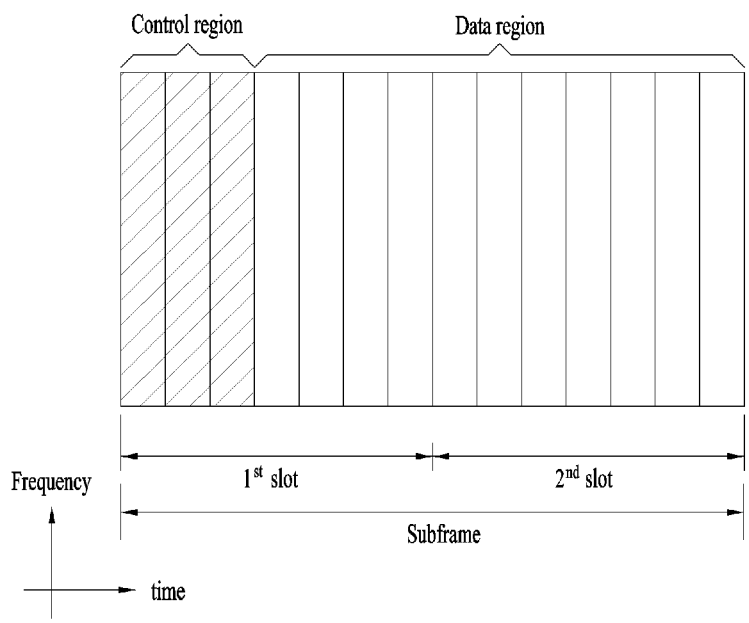
FIG. 8 is a diagram for an example of a structure of a downlink subframe.

FIG. 8 is a diagram for an example of a structure of a downlink subframe.

Referring to FIG. 8, maximum 3 (4) OFDM symbols located in a head part of a first slot of a subframe correspond to a control region to which control channels are assigned. The rest of OFDM symbols correspond to a data region to which PDSCHs (physical downlink shared channels) are assigned. Examples of downlink control channels used in LTE include a physical control format indicator channel (PCFICH), a physical downlink control channel (PDCCH), and a physical hybrid ARQ indicator channel (PHICH). The PCFICH is transmitted in a first OFDM symbol of a subframe and carries an information on the number of OFDM symbols used for transmission of the control channel within the subframe. The PHICH is a response channel in response to uplink transmission and carries an HARQ ACK/NACK (hybrid automatic repeat request acknowledgement/negative-acknowledgement) signal.

A control information transmitted through the PDCCH is referred to as a downlink control information (DCI). The DCI includes a resource allocation information for a user equipment or user equipment group and other control informations. For example, the DCI includes uplink/downlink scheduling information, uplink transmission (Tx) power control command and the like.

The PDCCH may include transmission format and resource allocation information of a downlink shared channel (DL-SCH), transmission format and resource allocation information of an uplink shared channel (UL-SCH), paging information on a paging channel (PCH), system information on the DL-SCH, resource allocation information of an upper layer control message such as a random access response transmitted on PDSCH, transmission (Tx) power control command set for individual user equipments within a random user equipment group, transmission (Tx) power control command, activation indication information of voice over Internet protocol (VoIP) and the like. A plurality of PDCCHs may be transmitted within the control region. A user equipment may monitor a plurality of the PDCCHs. The PDCCH is transmitted on aggregation of one or a plurality of continuous control channel elements (CCEs). The CCE is a logic assignment unit used to provide the PDCCH with a coding rate based on a radio channel state. The CCE corresponds to a plurality of resource element groups (REGs). A format of the PDCCH and the number of available bits of the PDCCH are determined depending on the number of CCEs. A base station determines the PDCCH format in accordance with the DCI which will be transmitted to a user equipment and attaches a cyclic redundancy check (CRC) to a control information. The CRC is masked with an identifier (e.g., radio network temporary identifier (RNTI)) in accordance with an owner or usage of the PDCCH. For instance, if the PDCCH is for a specific user equipment, the CRC may be masked with an identifier (e.g., cell-RNTI (C-RNTI)) of the corresponding user equipment. If the PDCCH is for a paging message, the CRC may be masked with a paging identifier (e.g., paging-RNTI (P-RNTI)). If the PDCCH is for a system information (particularly, system information block (SIB)), the CRC may be masked with a system information RNTI (SI-RNTI). If the PDCCH is for a random access response, the CRC may be masked with a random access RNTI (RA-RNTI).

Figure 9:
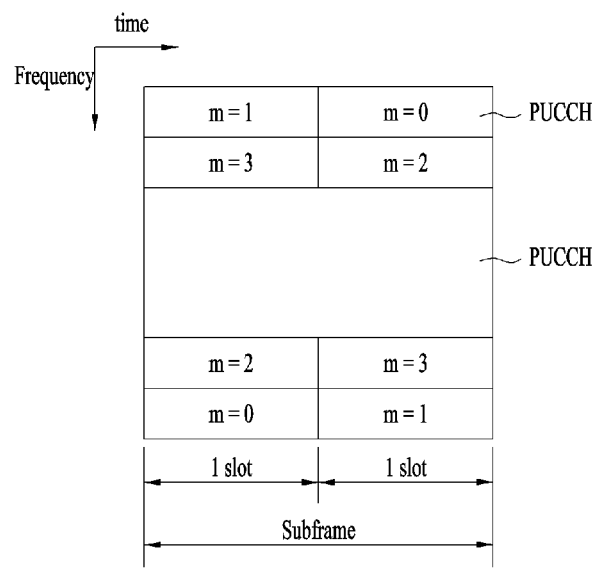
FIG. 9 is a diagram for a structure of an uplink subframe used in LTE.

FIG. 9 is a diagram for a structure of an uplink subframe used in LTE.

Referring to FIG. 9, an uplink subframe includes a plurality (e.g., 2 slots) of slots. Each of the slots may include a different number of SC-FDMA symbols depending on a length of CP. The uplink subframe may be divided into a data region and a control region in frequency domain. The data region includes PUSCH and is used to transmit such a data signal as audio or the like. The control region includes PUCCH and is used to transmit UCI (uplink control information). The PUCCH includes an RB pair located at both ends of the data region on a frequency axis and is hopped on a slot boundary.

The PUCCH can be used to transmit control informations in the following.

SR (scheduling request): Information used to make a request for an uplink UL-SCH resource. It is transmitted using an OOK (on-off keying) scheme.

HARQ ACK/NACK: Response signal in response to a downlink data packet on PDSCH. It indicates whether the downlink data packet has been successfully received. A 1-bit ACK/NACK is transmitted as a response to a single downlink codeword and a 2-bit ACK/NACK is transmitted as a response to two downlink codewords.

CSI (channel state information): Feedback information on a downlink channel. The CSI includes a channel quality indicator (CQI) and MIMO (multiple input multiple output) related feedback information includes a rank indicator (RI), a precoding matrix indicator (PMI), a precoding type indicator (PTI) and the like. 20-bit is used in each subframe.

The amount of a control information (UCI) that may be transmitted in a subframe by a user equipment depends on the number of SC-FDMA symbols available for control information transmission. The SC-FDMA symbols available for the control information transmission correspond to the rest of SC-FDMA symbols except SC-FDMA symbols used for reference signal transmission in the subframe. In case of a subframe in which a sounding reference signal (SRS) is configured, a last SC-FDMA symbol of the subframe is excluded from the SC-FDMA symbols available for the control information transmission. A reference signal is used for coherent detection of PUCCH.

When D2D communication is introduced to the aforementioned wireless communication system (e.g., 3GPP LTE system or 3GPP LTE-A system), a specific method of performing the D2D communication is described in the following.

Figure 10:
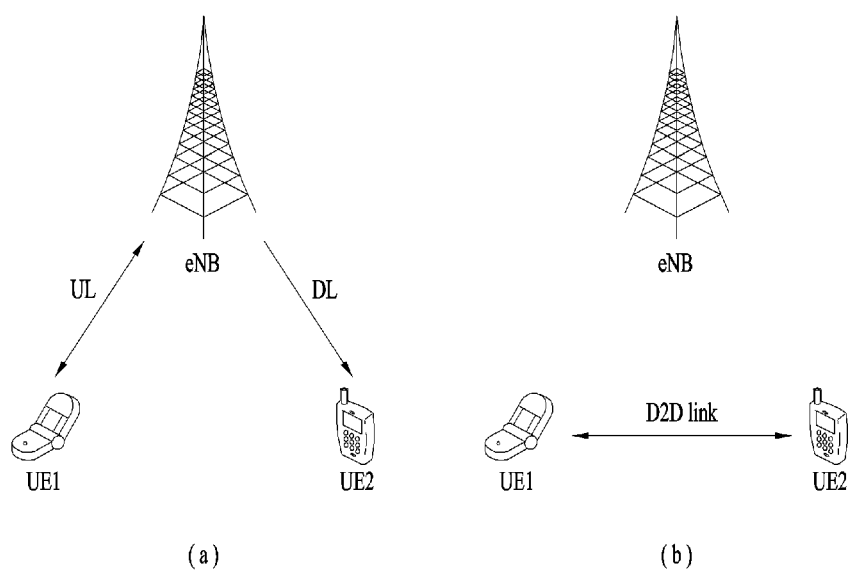
FIG. 10 is a conceptual diagram for D2D communication.

FIG. 10 is a diagram to describe D2D communication conceptually. FIG. 10(a) shows a conventional eNB-based (or BS-based) communication scheme. A 1$^{st}$ user equipment (UE1) transmits data to a base station (eNB) in uplink and the base station (eNB) may transmit the data from the $1^{st}$ user equipment (UE1) to a $2^{nd}$ user equipment (UE2) in downlink.

FIG. 10(b) shows a UE-to-UE communication scheme as one example of the D2D communication. Data exchange between user equipments may be performed without a base station (eNB). A direct link set between devices may be named a D2D link. Compared to the conventional eNB-based communication scheme, the D2D communication is advantageous in that delay (latency) is reduced and that a small amount of radio resources is required.

The D2D communication corresponds to a scheme that supports communication between devices (or user equipments) without the base station. However, since the D2D communication is performed using resources in a conventional wireless communication system (e.g., 3GPP LTE/LTE-A), the D2D communication should not cause an interference or disturbance to the conventional wireless communication system. In the same vein, it is also important to minimize an interference received by the D2D communication due to a user equipment, a base station and the like operating in the conventional wireless communication system.

The present invention proposes a method for setting cyclic prefix (CP) lengths of user equipments configured to perform D2D (device-to-device) communication based on the aforementioned description.

In a conventional wireless communication system (e.g., system before LTE Release 10), a user equipment performs blind decoding on SSS (secondary synchronization signal) and then selects an appropriate one from a normal CP and an extended CP depending on a situation of a cell. In this case, a CP length may have a cell-specific characteristic. On the contrary, in a D2D communication environment, a user equipment may perform two modes such as D2D communication and eNB communication at the same time. In this case, it may be preferable that a cyclic prefix length used for the D2D communication is set different from that used for the eNB communication.

Therefore, in the present invention, a method of setting a CP length for a subframe used for D2D communication is described as a supporting method for a user equipment to perform the D2D communication and eNB communication at the same time.

First of all, for clarity of the present invention, a user equipment (UE) participating in D2D communication is referred to as UE_D and a user equipment (UE) communicating with eNB only is referred to as UE_C. In this case, the UE_D may become the UE_C since one user equipment (UE) is able to perform communication with the eNB on a specific subframe only during performing the D2D communication. In particular, the UE_D can perform communication with a different UE_D, eNB or both of them on each subframe.

Moreover, in case of applying the present invention, regarding a subframe on which communication is performed by a user equipment, a subframe (SF) capable of being used for the D2D communication is referred to as SF_D and a subframe (SF) used for communication with the eNB only is referred to as SF_C. For clarity, the present invention is described on the premise that the SF_D and the SF_C are not overlapped with each other, by which the present invention is non-limited. Furthermore, the embodiments of the present invention may be applied to a case that the SF_D and the SF_C are overlapped with each other.

Even though the user equipment (i.e., UE_D) participates in the D2D communication, the user equipment does not release a connection to the eNB completely. In order to maintain both D2D communication and cellular communication (i.e., communication with eNB), a specific subframe is used as the SF_C and the rest of subframes may be used as the SF_D by subframe unit. Thus, the SF_C is configured in a current wireless communication system (i.e., Rel-10) so that either a normal CP or an extended CP is determined in a manner of performing blind decoding on SSS. Moreover, a CP length of a subframe (hereinafter called discovery SF_D) for a discovery signal is set different from that of a subframe (hereinafter called data SF_D) for transceiving data despite the same SF_D type.

Therefore, a method of setting different CP lengths of the above-mentioned SF_C, discovery SF_D and data SF_D is described in the present invention. The embodiments of the present invention described in the following may be extensively applied to a case that a plurality of links are formed. More particularly, a method and operation of determining CP lengths used for the discovery SF_D and the data SF_D are mainly described.

<$1^{st}$ Embodiment>

According to a $1^{st}$ embodiment of the present invention, a CP length of a subframe (SF_D), which can be used for D2D communication, can be configured to have a fixed value.

In particular, since each of UE_Ds has a unique TA (timing alignment) value in communicating with eNB, a separate time synchronization process between UE_Ds participating in D2D communication is required for D2D communication. However, since it is difficult to perform a complex time synchronization process such as an existing PRACH due to the properties of the D2D communication, an extended CP having an advantage in aspect of the time synchronization process may be configured to be used as a default CP.

In particular, some or whole part of the SF_D is operated as the extended CP irrespective of a CP length of SF_C. According to the above-mentioned method, since a separate signal for indicating CP length can be omitted, the method may be particularly useful in the following cases. First of all, eNB is unable to control UE_D since the corresponding UE_D is out of coverage of the eNB. Secondly, public safety related operations (e.g., disaster, emergency, etc.) are performed. Moreover, the method may be used as a beginning value (or default value) before changing the CP length.

<$2^{nd}$ Embodiment>

According to a $2^{nd}$ embodiment of the present invention, a CP length of a subframe (SF_D), which can be used for D2D communication, can be configured semi-statically or dynamically by eNB control.

According to the $2^{nd}$ embodiment of the present invention, (different from the above-mentioned $1^{st}$ embodiment) regarding a CP length configuration, a specific rule/configuration/information is (implicitly) configured between eNB and UE in advance and the CP length may be determined by the specific rule/configuration/information. Alternatively, a base station (eNB) may configure the CP length for UE and then transmit the configured CP length to UE through separate signaling (e.g., upper layer signaling).

In particular, since a user equipment (i.e., UE_D) participating in D2D communication maintains a connection to eNB despite performing the D2D communication, the eNB may indicate the CP length configuration of SF_D. Alternatively, if UE_D makes a request for an information related to a CP length for the D2D communication, eNB determines the CP length in accordance with the request from the UE_D and may then inform the UE_D of the CP length.

Furthermore, although a CP length of each of discovery SF_D and data SF_D may be informed through a downlink subframe (hereinafter called DL SF_C (e.g., RRC or a different physical downlink channel)) used for communication with eNB only, an indication of the CP length of the discovery SF_D or the data SF_D may be omitted according to a system configuration. Of course, in case that eNB determines that collision between entire D2D resources (e.g., time/frequency resources) is serious, the eNB may deny a request for the D2D communication.

Since the CP length configuration operation according to the $2^{nd}$ embodiment of the present invention requires a significantly long time, it has a characteristic of being configured semi-statically. Thus, it is preferable to apply the $2^{nd}$ embodiment to a case that UE exists within coverage of eNB and that it corresponds to non-urgent transmission (e.g., commercial data transmission).

<$3^{rd}$ Embodiment>

According to a $3^{rd}$ embodiment of the present invention, UEs (i.e., UE_Ds) participating in D2D communication may determine CP lengths without an indication by eNB.

For instance, according to the present invention, a CP length can be determined in a manner of applying PSS or SSS (hereinafter, PSS and SSS changed for D2D usage according to the present invention are defined as PSS_D and SSS_D respectively) to a discovery signal similar to a conventional wireless communication system (i.e., system before 3GPP LTE Rel.-10).

In particular, it corresponds to a method of determining the CP length through detection timing difference between two OFDM symbols in a manner of locating discovery signals (e.g., synchronization signals such as PSS_D and SSS_D) in a plurality of OFDM symbols. For instance, a transmitting user equipment transmits PSS_D in a manner of locating the PSS_D at a slot boundary (i.e., $7^{th}$ OFDM symbol in case of a normal CP and $6^{th}$ OFDM symbol in case of an extended CP). And, the transmitting user equipment transmits SSS_D in a manner of locating the SSS_D in an OFDM symbol ahead of the slot boundary (i.e., $6^{th}$ OFDM symbol in case of a normal CP and $5^{th}$ OFDM symbol in case of an extended CP). After having detected the PSS_D through monitoring the PSS_D at every time, a receiving user equipment attempts to detect (i.e., performs blind detection on) the SSD at two timings (i.e., two different timings of the normal CP and extended CP) at which the SSS_D is estimated to be located with reference to the detection timing (e.g., slot boundary). Therefore, the receiving user equipment can calculate the actually applied CP length.

Moreover, if SSS_D is located apart by a prescribed difference (e.g., at least one or more OFDM symbols) with reference to an OFDM symbol from which PSS_D is detected, an applied CP length can be calculated in a manner of comparing (i.e., performing blind detection on) two types of CPs (i.e., SSS_D in case of a normal CP and SSS_D in case of an extended CP) with each other using FFT. For instance, if PSS_D is located at a random OFDM symbol instead of the slot boundary, a user equipment detects the PSS_D through monitoring the PSS_D at every time and may then perform blind detection on SSS_D with reference to the detected PSS_D. Therefore, if the SSS_D is located apart by the prescribed number of OFDM symbols with reference to a location of the PSS_D (irrespective of before/after) and the prescribed number of the OFDM symbols corresponds to one of SSS_D of the normal CP and SSS_D of the extended CP, the user equipment can check the applied CP length.

If a scheme of LTE Rel.-10 is used as it is, a CP length of discovery SF_D is equal to that of data SF_D due to a characteristic that CP lengths are equal to each other in a cell. However, if a discovery signal is transmitted in a manner that a CP length information of the data SF_D is included in the discovery signal, the CP length of the discovery SF_D may be different from that of the data SF_D.

For example, since D2D communication targets communication between UE_Ds located close to each other, it has a high probability that a channel state is relatively good. Thus, a discovery signal is configured to enable a multi-path characteristic of a channel to be determined In case that the discovery signal is received, if the multi-path characteristic of the channel is less than a prescribed level, a normal CP having 14 OFDM symbols may be determined to be used. In case that the multi-path characteristic of the channel is greater than the prescribed level, if the use of the extended CP is already determined, an extended CP having 12 OFDM symbols may be determined to be used.

However, in this case, a user equipment participating in the D2D communication should be aware of a CP length of a subframe in order to receive the discovery signal. The user equipment participating in the D2D communication can obtain the CP length of the subframe for receiving the discovery signal i) in a manner that the discovery signal is located in a last OFDM symbol of a slot irrespective of a CP length value (i.e., PSS in LTE Rel.-10), ii) in a manner of following a pre-defined default CP length (e.g., extended CP), iii) in a manner of following a CP length indicated through an upper layer signal transmitted from SF_D or a separate physical layer signal (e.g., RRC signal, PDCCH, etc.) or iv) in a manner of being configured to perform blind decoding on both of the normal CP and the extended CP in the corresponding subframe/symbol.

For another example, UE_D can determine a CP length (according to a pre-defined configuration) by itself. For instance, according to a type of D2D data, the UE_D can set the CP length as an extended CP in case of an urgent data transmission (e.g., public safety) and as a normal CP in case of a general data transmission (e.g., commercial data transmission) by itself. In this case, the UE_D (e.g., UE #1) should inform another UE_D (e.g., UE #2) of the CP length through eNB or transmit an information of the CP length in a manner of including the information of the CP length in a discovery signal.

As a particular example, a part of parameters (e.g., sequence index, hopping pattern, cyclic shift, comb, etc.) of discovery sequence are set different for each of the normal CP and the extended CP. Therefore, another UE_D can determine the information of the CP length if receiving the discovery signal normally. Further, in this case, a CP length of discovery SF_D can be different from that of data SF_D.

According to the $3^{rd}$ embodiment, since the UE_D can determine the CP length, it has an advantage of capable of being applied to a case that the CP length is changed/reconfigured for D2D communication between UEs existing outside of coverage.

If a CP length has been determined according to the above-mentioned embodiments of the present invention, a signal corresponding to ACK is transmitted to another UE_D in accordance with the determined CP length. A transmission timing (e.g., n+4 from discovery signal) of the signal corresponding to the ACK may be defined in advance. In particular, after the discovery signal has been received, CP length of SF_D for transmitting the ACK is automatically determined. Moreover, although a user equipment may transmit the ACK through PUCCH or PUSCH of the SF_D (or channel of which a part is changed for D2D usage), the user equipment can omit such a process for transmitting the ACK and then start data transmission immediately in some cases (in this case, UE_D may consider to receive the ACK if data is transferred).

Each of the above-mentioned embodiments of the present invention can be implemented independently but it may be implemented as a combination of the embodiments in consideration of the effective use of radio resources or D2D performance. For clarity of the present invention, redundant description shall be omitted.

Figure 11:
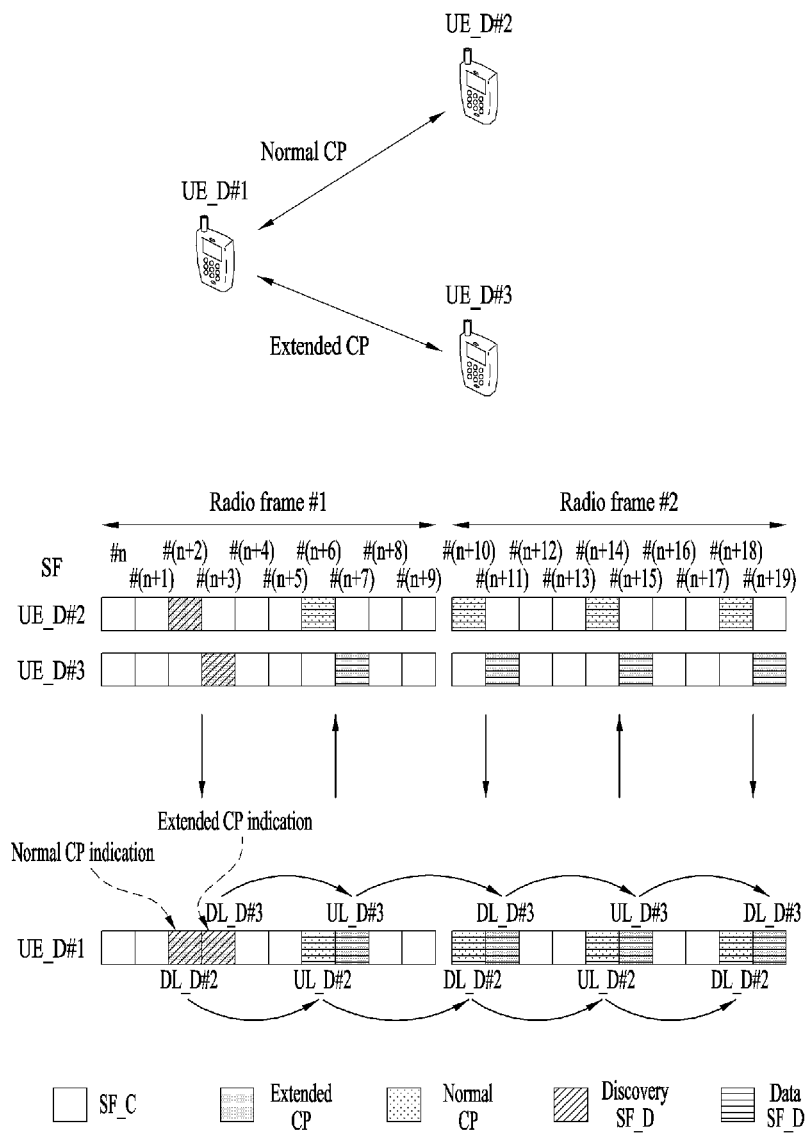
FIG. 11 and FIG. 12 are diagrams for examples of setting (or resetting) CP for D2D communication according to an embodiment of the present invention.

According to the present invention, a subframe for a discovery signal used for D2D communication (Discovery subframe for D2D communication, which referred to as "Discovery SF D" in FIG. 11) is configured to follow an extended CP as default. However, a subframe for D2D communication data transmission (Data suframe for D2D communication, which referred to as "Data SF _D" in FIG. 11) may be changed to follow a normal CP if a user equipment receives a CP length information of the discovery signal and recognizes that the D2D communication is performed in accordance with the normal CP. Further, it is preferable that the above-mentioned CP configuration of the user equipment is maintained if a separate changing signal is received from eNB or until the configuration on the CP length is changed by a new discovery signal.

For another example, FIG. 11 shows a case for each of user equipments participating in D2D communication to set a CP length of a subframe for a discovery signal (Discovery SF D) as an extended CP.

In FIG. 11, assume a case that UE_D #1 performs D2D communication with UE_D #2 and UE_D #3. Moreover, in FIG. 11, assume that a discovery signal is previously configured to be transmitted using an extended CP.

Referring to FIG. 11, while UE_D #1 monitors a discovery signal using an extended CP at all times until detecting the discovery signal of a different UE_D from a subframe for D2 D communication, the UE_D #1 can receive the discovery signal from each of the UE_D #2 and UE_D #3.

In this case, each discovery signal includes an information indicating a normal CP or extended CP. And, it may be known that a subframe (Data SF_D) for the D2 D communication is changed to correspond to the corresponding CP after a pre-defined fixed interval.

In particular, if the UE_D #1 receives a discovery signal including an information indicating data SF_D using the normal CP from the UE_D #2, the UE_D #1 may be changed to perform the D2 D communication with the UE_D #2 using the normal CP after prescribed offset (i.e., DL_D #2 and UL_D #2). On the contrary, if the UE_D #1 receives a discovery signal including an information indicating data SF_D using the extended normal CP from the UE_D #3, the UE_D #1 may perform the D2 D communication with the UE_D #3 in accordance with the pre-defined extended CP (i.e., DL_D #3 and UL_D #3).

In FIG. 11, for clarity of the description, if a discovery SF corresponds to n, Data SF_Ds are located at subframes of n+4, n+8, . . . (i.e., in case that offset is set to 4 ). However, the present invention is non-limited by the offset. In some cases, different offset may be applied (e.g., n+5, n+9, . . .). Moreover, an interval of Data SF_D may be set to a different value instead of 4. Furthermore, in FIG. 11, a CP configuration of the Data SF_D can be maintained semi-statically until an indication on a new CP length is received.

Figure 12:
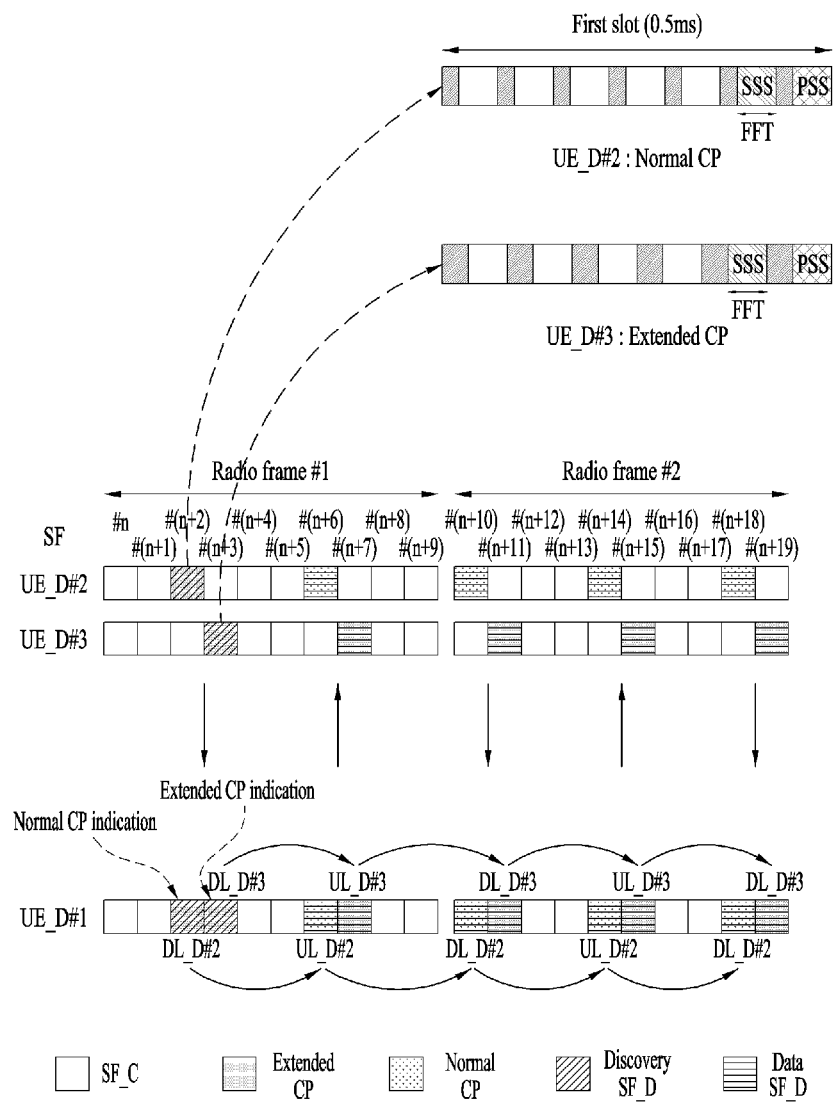

For further example, referring to FIG. 12, a CP length of a subframe for a discovery signal (Discovery SF) is configured using PSS_D/SSS$_{13}$ D for each of user equipments participating in D2D communication.

Referring to FIG. 12, UE_D #1 performs FFT at both two symbol timings of a normal CP and an extended CP at all times until detecting a discovery signal of a different UE_D from a subframe for D2D communication. In particular, the UE_D #1 can determine a type of CP by performing the FFT on SSS in an OFDM symbol located apart by a prescribed distance with reference to PSS at the normal CP and extended CP timings. Therefore, the UE_D #1 may set a CP length of a subframe for the D2D communication with the different UE_D (i.e., UE_D #2 or UE_D #3) in accordance with the determined CP length.

In particular, in case that a timing difference between the PSS and the SSS, which are received from the UE_D #2, for the D2D communication corresponds to the normal CP, the UE_D #1 may be changed to perform the D2D communication with the UE_D #2 in accordance with the normal CP. On the contrary, if a timing difference between PSS_D and SSS_D, which are received from the UE_D #3, for the D2D communication corresponds to the extended CP, the UE_D #1 may perform the D2D communication with the UE_D #3 by maintain the extended CP.

In FIG. 12, it is described that the CP length is determined irrespective of eNB. However, it is possible that a CP length of a subframe for the discovery signal used for the D2D communication (Discovery subframe for D2D communication, which referred to as "Discovery SF D" in FIG. 12) is configured by the eNB or that CP lengths of entire subframes used for the D2D communication (Data suframe for D2D communication, which referred to as "Data SF_D" in FIG. 12) are given.

In particular, while UE_D monitors a discovery signal using a CP length (discovery CP length) for the discovery signal indicated by the eNB, if the UE_D detects the discovery signal, the UE_D performs communication by switching the CP length for the discovery signal into a CP length (data CP length) for transceiving data signals. Alternatively, the UE_D may use the CP length indicated through the discovery signal as the CP length (data CP length) for the data signal.

Further, it may consider a situation that UE_D participating in the D2D communication transmits a signal to each of eNB and a different UE_D in one subframe or that UE_D participating in the D2D communication simultaneously transceives signals with several UE_Ds by receiving a plurality of discovery signals (e.g., group D2D or one-to-multi D2D).

If a CP length of an eNB signal is different from that of a UE_D signal or CP lengths of signals between the UE_Ds are different from each other, timings of transmission symbols are different from each other, whereby it is impossible to transmit or the cost or complexity of implementing a transmission device increases significantly. In this case, a priority is given according to a CP length. Thus, a set of CP lengths with high priority is transmitted and a set of CP lengths with low priority is dropped.

For instance, the priority may be given i) in accordance with a CP length (e.g., extended CP has priority), ii) in accordance with a transmitted content (e.g., public safety has priority) or iii) per transmission target (e.g., priority is given in order of UE_D #2, eNB and UE_D #3) and only a set of CP lengths of the same type may be transmitted from the high priority.

Figure 13:
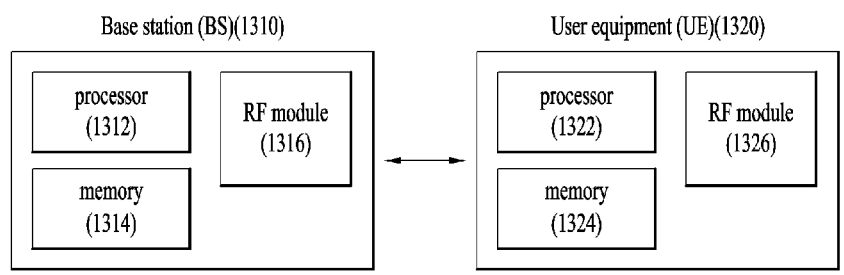
FIG. 13 is a diagram for examples of a base station and a user equipment applicable to an embodiment of the present invention.

FIG. 13 is a diagram for examples of a base station and a user equipment applicable to an embodiment of the present invention. If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 13, a wireless communication system includes a base station BS 1310 and a user equipment UE 1320. The base station 1310 includes a processor 1312, a memory 1314 and an RF (radio frequency) unit 1316. The processor 1312 can be configured to implement the procedures and/or methods proposed by the present invention. The memory 1314 is connected to the processor 1312 and stores various kinds of informations related to operations of the processor 1312. The RF unit 1316 is connected to the processor 1312 and transmits and/or receives radio or wireless signals. The user equipment 1320 includes a processor 1322, a memory 1324 and an RF unit 1326. The processor 1322 can be configured to implement the procedures and/or methods proposed by the present invention. The memory 1324 is connected to the processor 1322 and stores various kinds of informations related to operations of the processor 1322. The RF unit 1326 is connected to the processor 1322 and transmits and/or receives radio or wireless signals. The base station 1310 and/or the user equipment 1320 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

Embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of configuring cyclic prefix for D2D (device-to-device) communication in a wireless communication system and apparatus therefor are mainly described with reference to the examples of applying to 3GPP LTE system, as mentioned in the foregoing description, the present invention is applicable to various kinds of wireless communication systems as well as to the 3GPP LTE system.

What is claimed is:

1. A method of performing device-to-device (D2D) communication by a first user equipment in a wireless communication system, the method comprising:
    receiving a discovery signal in a discovery subframe;
    determining a type of a cyclic prefix (CP) length in the discovery subframe; and
    configuring to receive D2D data in a data subframe of a second user equipment using a CP length for the data subframe determined according to the determined type of the CP length after a prescribed offset,
    wherein the discovery signal comprises a primary synchronization signal (PSS) and a secondary synchronization signal (SSS) set for the D2D communication,
    wherein the PSS is received in an orthogonal frequency division multiplexing (OFDM) symbol next to an OFDM symbol in which the SSS is received, and
    wherein the type of the CP length is determined based on a detection timing difference between the PSS and the SSS.

2. The method of claim 1, wherein the detection timing difference corresponds to one of a detection timing difference between the PSS and the SSS defined for a normal CP or a detection timing difference between the PSS and the SSS defined for an extended CP.

3. The method of claim 1, wherein the type of the CP length is maintained until a new discovery signal for the D2D communication is received.

4. The method of claim 1, wherein the type of the CP length is independently set for each of at least one of different user equipments.

5. The method of claim 1,
    wherein the type of the CP length is set different for each of a multitude of D2D groups for the D2D communication, and
    wherein the each of multitude of the D2D groups is configured with either at least one user equipment or a base station.

6. The method of claim 5, wherein if the discovery signal is simultaneously transmitted to the multitude of the D2D groups, the discovery signal is transmitted to only one D2D group determined according to a priority depending on the type of CP length.

7. A user equipment for performing device-to-device (D2D) communication in a wireless communication system, the user equipment comprising:
    a radio frequency unit; and
    a processor coupled with the radio frequency unit for controlling the D2D communication,
    wherein the processor is configured to:
        receive a discovery signal in a discovery subframe, determine a type of a cyclic prefix (CP) length in the discovery subframe, and configure to receive a D2D data in a data subframe of another user equipment using a CP length for the data subframe determined according to the determined type of the CP length after a prescribed offset, wherein the discovery signal comprises a primary synchronization signal (PSS) and a secondary synchronization signal (SSS) set for the D2D communication, wherein the PSS is received in an orthogonal frequency division multiplexing (OFDM) symbol next to an OFDM symbol in which the SSS is received, and wherein the type of the CP length is determined based on a detection timing difference between the PSS and the SSS.

8. The method of claim 1, wherein the determined type of CP length is a normal CP length or an extended CP length.

9. The user equipment of claim 7, wherein the determined type of CP length is a normal CP length or an extended CP length.

* * * * *